US009109673B2

(12) United States Patent
Lee et al.

(10) Patent No.: US 9,109,673 B2
(45) Date of Patent: Aug. 18, 2015

(54) PLANETARY GEAR TRAIN OF AUTOMATIC TRANSMISSION FOR VEHICLE

(71) Applicant: Hyundai Motor Company, Seoul (KR)

(72) Inventors: Chang Wook Lee, Whasung-Si (KR); Kangsoo Seo, Whasung-Si (KR); Jae Chang Kook, Whasung-Do (KR); Jongsool Park, Whasung-Si (KR); Myonghoon Noh, Whasung-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/092,123

(22) Filed: Nov. 27, 2013

(65) Prior Publication Data

US 2014/0296021 A1 Oct. 2, 2014

(30) Foreign Application Priority Data

Apr. 1, 2013 (KR) ........................ 10-2013-0035371

(51) Int. Cl.
*F16H 3/66* (2006.01)
*F16H 37/04* (2006.01)

(52) U.S. Cl.
CPC .......... *F16H 3/663* (2013.01); *F16H 2037/047* (2013.01); *F16H 2200/006* (2013.01); *F16H 2200/0086* (2013.01); *F16H 2200/2007* (2013.01); *F16H 2200/2046* (2013.01)

(58) Field of Classification Search
CPC ............... F16H 3/66; F16H 3/60; F16H 1/46; F16H 2200/006; F16H 2200/2046; F16H 2200/2007
USPC .................. 475/275–291, 313, 319, 325, 903
See application file for complete search history.

(56) References Cited

U.S. PATENT DOCUMENTS

2005/0227806 A1* 10/2005 Klemen et al. ................ 475/275
2007/0072730 A1* 3/2007 Shim ............................ 475/275
2009/0221394 A1* 9/2009 Phillips et al. ................ 475/213
2014/0128211 A1* 5/2014 Phillips ......................... 475/329
2014/0141928 A1* 5/2014 Lee et al. ...................... 475/284

FOREIGN PATENT DOCUMENTS

KR 0183075 B1 4/1999
KR 10-0610790 B1 8/2006
KR 10-1172304 B1 8/2012
WO WO9602772 A * 2/1996

* cited by examiner

*Primary Examiner* — Roger Pang
(74) *Attorney, Agent, or Firm* — Morgan, Lewis & Bockius LLP

(57) ABSTRACT

A planetary gear train of an automatic transmission may include an input shaft, an output shaft, a compound planetary gear set disposed on the output shaft, and including a first rotation element selectively connected to the input shaft through two paths respectively having an externally-meshed gear and operated as a selective fixed element, a second rotation element selectively connected to the input shaft through one path having an externally-meshed gear and operated as a selective fixed element, a third rotation element connected to the output shaft, and a fourth rotation element selectively connected to the input shaft through one path having an externally-meshed gear, three transfer gears forming the externally-meshed gears, and friction elements provided with clutches selectively connecting the first, second, and fourth rotation elements to the input shaft and brakes selectively connecting the first and second rotation elements to a transmission housing.

19 Claims, 7 Drawing Sheets

FIG. 2

| | C1 | C2 | C3 | C4 | B1 | B2 | gear ratio | step ratio |
|---|---|---|---|---|---|---|---|---|
| D1 | ● | | | | ● | | 5.662 | |
| D2 | ● | | | | | ● | 3.440 | 1.646 |
| D3 | ● | ● | | | | | 2.366 | 1.454 |
| D4 | ● | | ● | | | | 1.685 | 1.404 |
| D5 | ● | | | ● | | | 1.319 | 1.277 |
| D6 | | | ● | ● | | | 0.987 | 1.336 |
| D7 | | ● | | ● | | | 0.783 | 1.261 |
| D8 | | | | ● | | ● | 0.675 | 1.160 |
| REV1 | | ● | | | ● | | -4.898 | |
| REV2 | | | ● | | ● | | -2.134 | |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2013-0035371 filed on Apr. 1, 2013, the entire contents of which is incorporated herein for all purposes by this reference.

BACKGROUND OF THE INVENTION

1. Field of the Invention

The present invention relates to an automatic transmission for a vehicle. More particularly, the present invention relates to a planetary gear train of an automatic transmission for a vehicle that can improve mountability and power delivery performance and reduce fuel consumption.

2. Description of Related Art

Recently, vehicle makers direct all their strength to improve fuel economy due to worldwide high oil prices and strengthen of exhaust gas regulations.

Improvement of fuel economy may be achieved by multi-shift mechanism realizing greater number of shift speeds in an automatic transmission. Typically, a planetary gear train is realized by combining a plurality of planetary gear sets and friction elements.

It is well known that when a planetary gear train realizes a greater number of shift speeds, speed ratios of the planetary gear train can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear). In addition, the planetary gear train has different features such a durability, power delivery efficiency, and size depend on the layout thereof. Therefore, designs for a combining structure of a gear train are also under continuous investigation.

If the number of shift-speeds, however, increases, the number of components in the automatic transmission also increases. Therefore, mountability, cost, weight and power delivery efficiency may be deteriorated.

Particularly, since the planetary gear train having a number of components is hard to be mounted in a front wheel drive vehicle, researches for minimizing the number of components have been developed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving mountability by minimizing a length thereof and the number of components as a consequence of achieving eight forward speeds and two reverse speeds by disposing one compound planetary gear set on an output shaft and by connecting rotation elements of the compound planetary gear set to an input shaft through a plurality of externally-meshed gears.

In addition, various aspects of the present invention are directed to providing a planetary gear train of an automatic transmission for a vehicle having further advantages of enabling of setting optimum gear ratios due to ease of changing gear ratios by using a plurality of externally-meshed gears, and accordingly improving power delivery performance and fuel economy.

In addition, various aspects of the present invention are directed to providing a planetary gear train of an automatic transmission for a vehicle having further advantages of improving performance in reverse speeds by achieving two reverse speeds.

In an aspect of the present invention, a planetary gear train of an automatic transmission for a vehicle, may include an input shaft receiving torque of an engine, an output shaft disposed apart from and in parallel with the input shaft, a compound planetary gear set disposed on the output shaft, and including a first rotation element selectively connected to the input shaft through two paths respectively having an externally-meshed gear and operated as a selective fixed element, a second rotation element selectively connected to the input shaft through one path having an externally-meshed gear and operated as a selective fixed element, a third rotation element connected to the output shaft so as to be operated as an output element, and a fourth rotation element selectively connected to the input shaft through one path having an externally-meshed gear, three transfer gears forming the externally-meshed gears, and friction elements including clutches selectively connecting the first, second, and fourth rotation elements to the input shaft, and brakes selectively connecting the first and second rotation elements to a transmission housing.

The compound planetary gear set may include a first planetary gear set being a double pinion planetary gear set, and a second planetary gear set being a single pinion planetary gear set and having a ring gear and a planet carrier in common, wherein the first rotation element is a second sun gear, the second rotation element is the planet carrier, the third rotation element is the ring gear, and the fourth rotation element is a first sun gear.

The three transfer gears may include a first transfer gear including a first transfer drive gear connected to the input shaft, and a first transfer driven gear selectively connected to the first rotation element and the fourth rotation element, a second transfer gear including a second transfer drive gear connected to the input shaft, and a second transfer driven gear connected to the first rotation element, and a third transfer gear including a third transfer drive gear connected to the input shaft, and a third transfer driven gear connected to the second rotation element.

The clutches may include a first clutch disposed between the first transfer gear and the fourth rotation element, a second clutch disposed between the first transfer gear and the first rotation element, a third clutch disposed between the input shaft and the second transfer gear, a fourth clutch disposed between the input shaft and the third transfer gear, and the brakes may include a first brake disposed between the third transfer gear and the transmission housing, and a second brake disposed between the second transfer gear and the transmission housing.

The first brake is disposed between the third transfer drive gear and the transmission housing.

The first brake is disposed between the third transfer driven gear and the transmission housing.

The second brake is disposed between the second transfer drive gear and the transmission housing.

The second brake is disposed between the second transfer driven gear and the transmission housing.

The clutches may include a first clutch disposed between the first transfer gear and the fourth rotation element, a second clutch disposed between the first transfer gear and the first rotation element, a third clutch disposed between the second transfer gear and the first rotation element, a fourth clutch disposed between the input shaft and the third transfer gear, wherein the brakes may include a first brake disposed between the third transfer gear and the transmission housing, and a second brake disposed between the second transfer gear and the transmission housing.

The clutches may include a first clutch disposed between the first transfer gear and the fourth rotation element, a second clutch disposed between the first transfer gear and the first rotation element, a third clutch disposed between the input shaft and the second transfer gear, a fourth clutch disposed between the third transfer gear and the second rotation element, wherein the brakes may include a first brake disposed between the third transfer gear and the transmission housing, and a second brake disposed between the second transfer gear and the transmission housing.

The first clutch and the first brake are operated at a first forward speed, the first clutch and the second brake are operated at a second forward speed, the first clutch and the second clutch are operated at a third forward speed, the first clutch and the third clutch are operated at a fourth forward speed, the first clutch and the fourth clutch are operated at a fifth forward speed, the third clutch and the fourth clutch are operated at a sixth forward speed, the second clutch and the fourth clutch are operated at a seventh forward speed, the fourth clutch and the second brake are operated at an eighth forward speed, the second clutch and the first brake are operated at a first reverse speed, and the third clutch and the first brake are operated at a second reverse speed.

In another aspect of the present invention, a planetary gear train of an automatic transmission for a vehicle, may include an input shaft receiving torque of an engine, an output shaft disposed apart from and in parallel with the input shaft, a compound planetary gear set including a first planetary gear set being a double pinion planetary gear set, and a second planetary gear set being a single pinion planetary gear set and having a ring gear and a planet carrier in common, and including a first rotation element being a second sun gear, a second rotation element being the planet carrier, a third rotation element being the ring gear, and a fourth rotation element being a first sun gear, a first transfer gear including a first transfer drive gear connected to the input shaft, and a first transfer driven gear selectively connected to the first rotation element and the fourth rotation element, a second transfer gear including a second transfer drive gear connected to the input shaft, and a second transfer driven gear connected to the first rotation element, a third transfer gear including a third transfer drive gear connected to the input shaft, and a third transfer driven gear connected to the second rotation element, and friction elements including clutches selectively connecting the first, second, and fourth rotation elements to the input shaft, and brakes selectively connecting the first and second rotation elements to a transmission housing.

The clutches may include a first clutch disposed between the first transfer gear and the fourth rotation element, a second clutch disposed between the first transfer gear and the first rotation element, a third clutch disposed between the input shaft and the second transfer gear, a fourth clutch disposed between the input shaft and the third transfer gear, and the brakes may include a first brake disposed between the third transfer gear and the transmission housing, and a second brake disposed between the second transfer gear and the transmission housing.

The first brake is disposed between the third transfer drive gear and the transmission housing.

The first brake is disposed between the third transfer driven gear and the transmission housing.

The second brake is disposed between the second transfer drive gear and the transmission housing.

The second brake is disposed between the second transfer driven gear and the transmission housing.

The clutches may include a first clutch disposed between the first transfer gear and the fourth rotation element, a second clutch disposed between the first transfer gear and the first rotation element, a third clutch disposed between the second transfer gear and the first rotation element, a fourth clutch disposed between the input shaft and the third transfer gear, and the brakes may include a first brake disposed between the third transfer gear and the transmission housing, and a second brake disposed between the second transfer gear and the transmission housing.

The clutches may include a first clutch disposed between the first transfer gear and the fourth rotation element, a second clutch disposed between the first transfer gear and the first rotation element, a third clutch disposed between the input shaft and the second transfer gear, a fourth clutch disposed between the third transfer gear and the second rotation element, and the brakes may include a first brake disposed between the third transfer gear and the transmission housing, and a second brake disposed between the second transfer gear and the transmission housing.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of friction elements at each shift-speed applied to a planetary gear train according to the various exemplary embodiments of the present invention.

Figure 1:
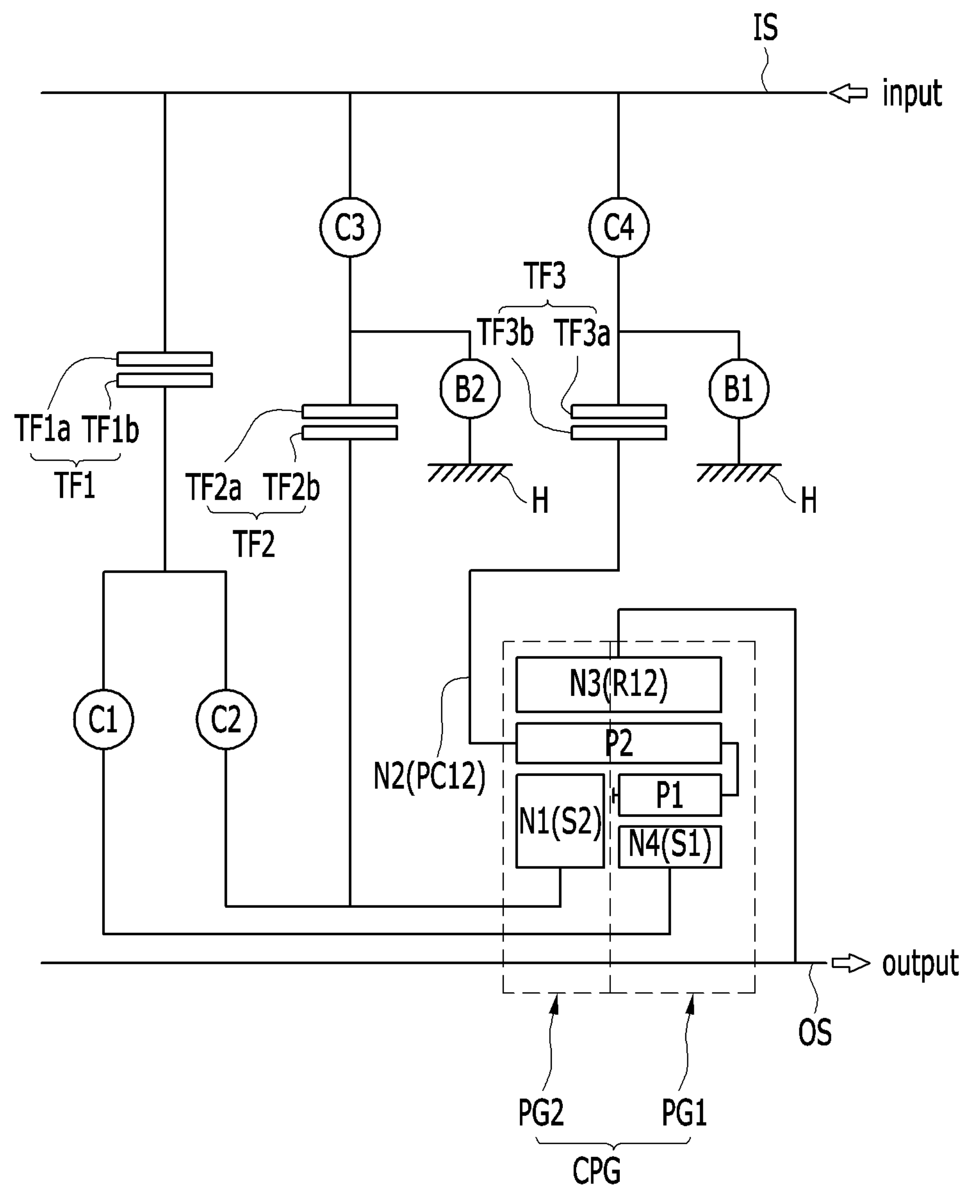
FIG. 1 is a schematic diagram of a planetary gear train according to the various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a planetary gear train according to the first exemplary embodiment of the present invention.

Referring to FIG. 1, a planetary gear train according to the first exemplary embodiment of the present invention includes an input shaft IS and an output shaft OS disposed apart from and in parallel with each other, a compound planetary gear set CPG disposed on the output shaft OS, three transfer gears TF1, TF2, and TF3, and friction elements including four clutches C1, C2, C3, and C4 and two brakes B1 and B2.

The input shaft IS is an input member, and torque from a crankshaft of an engine is changed though a torque converter and is input to the input shaft IS.

The output shaft OS is an output member and supports the compound planetary gear set CPG without rotational interference therebetween. Torque changed by and output from the compound planetary gear set CPG is transmitted to a driving wheel through a final reduction gear and a differential apparatus.

The compound planetary gear set CPG is formed by combining a first planetary gear set PG1 being a double pinion planetary gear set and a second planetary gear set PG2 being a single pinion planetary gear set so as to be the compound planetary gear set of Ravingneaux type having a ring gear and a planet carrier in common.

For ease of description, the ring gear is represented by a common ring gear R12, the planet carrier is represented by a common planet carrier PC12, a sun gear engaged with a short pinion P1 is represented by a first sun gear S1, and a sun gear engaged with a long pinion P2 is represented by a second sun gear S2.

In this case, the compound planetary gear set CPG includes a first rotation element N1 being the second sun gear S2, a second rotation element N2 being the common planet carrier PC12, a third rotation element N3 being the common ring gear R12, and a fourth rotation element N4 being the first sun gear S1.

In addition, the third rotation element N3 is an output element and is directly connected to the output shaft OS, and the first, second, and fourth rotation elements N1, N2, and N4 are selectively connected to the input shaft IS and a transmission housing H through three transfer gears TF1, TF2, and TF3 and six friction elements C1, C2, C3, C4, B1, and B2.

The first, second, and third transfer gears TF1, TF2, and TF3 respectively have first, second, and third transfer drive gears TF1*a*, TF2*a* and TF3*a* and first, second, and third transfer driven gears TF1*b*, TF2*b* and TF3*b* externally meshed with each other.

The first transfer gear TF1 is arranged to transmit torque of the input shaft IS to the first rotation element N1 and the fourth rotation element N4.

The second transfer gear TF2 is arranged to transmit the torque of the input shaft IS to the first rotation element N1.

The third transfer gear TF3 is arranged to transmit the torque of the input shaft IS to the second rotation element N2.

Therefore, the rotation elements N1, N2, and N4 of the compound planetary gear set CPG connected to the input shaft IS through the first, second, and third transfer gears TF1, TF2, and TF3 are rotated in opposite direction to rotation direction of the input shaft IS. Gear ratios of the first, second, and third transfer gears TF1, TF2, and TF3 are set according to a target speed ratio at each shift-speed.

In addition, the first, second, third, and fourth clutches C1, C2, C3, and C4 selectively connect the input shaft IS with selected rotation elements of the compound planetary gear set CPG so as to input the torque of the input shaft IS to the selected rotation elements of the compound planetary gear set CPG. The first and second brakes B1 and B2 selectively connect selected rotation elements of the compound planetary gear set CPG to the transmission housing H so as to operate the selected rotation elements as fixed elements.

The first clutch C1 is disposed between the first transfer gear TF1 and the fourth rotation element N4 and selectively transmits the torque of the input shaft IS to the fourth rotation element N4.

The second clutch C2 is disposed between the first transfer gear TF1 and the first rotation element N1 and selectively transmits the torque of the input shaft IS to the first rotation element N1.

The third clutch C3 is disposed between the input shaft IS and the second transfer gear TF2 and selectively transmits the torque of the input shaft IS to the first rotation element N1.

The fourth clutch C4 is disposed between the input shaft IS and the third transfer gear TF3 and selectively transmits the torque of the input shaft IS to the second rotation element N2.

The first brake B1 is disposed between the second rotation element N2 and the transmission housing H and selectively operates the second rotation element N2 as the fixed element. For this purpose, the first brake B1 is disposed between the third transfer drive gear TF3*a* and the transmission housing H in the first exemplary embodiment.

The second brake B2 is disposed between the first rotation element N1 and the transmission housing H and selectively operates the first rotation element N1 as the fixed element. For this purpose, the second brake B2 is disposed between the second transfer drive gear TF2*a* and the transmission housing H in the first exemplary embodiment.

Both of the second clutch C2 and the third clutch C3 selectively connect the input shaft IS to the first rotation element N1, but a rotation speed transmitted to the first rotation element N1 through the second clutch C2 differs from a rotation speed transmitted to the first rotation element N1 through the third clutch C3 because the gear ratio of the first transfer gear TF1 differs from that of the second transfer gear TF2.

In addition, the friction elements including the first, second, third, and fourth clutches C1, C2, C3, and C4 and the first and second brakes B1 and B2 are conventional multi-plate friction elements of wet type that are operated by hydraulic pressure.

FIG. 2 is an operational chart of friction elements at each shift-speed applied to a planetary gear train according to the first exemplary embodiment of the present invention.

As shown in FIG. 2, two frictional elements are operated at each shift-speed in the planetary gear train according to the first exemplary embodiment of the present invention.

The first clutch C1 and the first brake B1 are operated at a first forward speed D1.

The first clutch C1 and the second brake B2 are operated at a second forward speed D2.

The first clutch C1 and the second clutch C2 are operated at a third forward speed D3.

The first clutch C1 and the third clutch C3 are operated at a fourth forward speed D4.

The first clutch C1 and the fourth clutch C4 are operated at a fifth forward speed D5.

The third clutch C3 and the fourth clutch C4 are operated at a sixth forward speed D6.

The second clutch C2 and the fourth clutch C4 are operated at a seventh forward speed D7.

The fourth clutch C4 and the second brake B2 are operated at an eighth forward speed D8.

The second clutch C2 and the first brake B1 are operated at a first reverse speed REV1.

The third clutch C3 and the first brake B1 are operated at a second reverse speed REV2.

Figure 3:
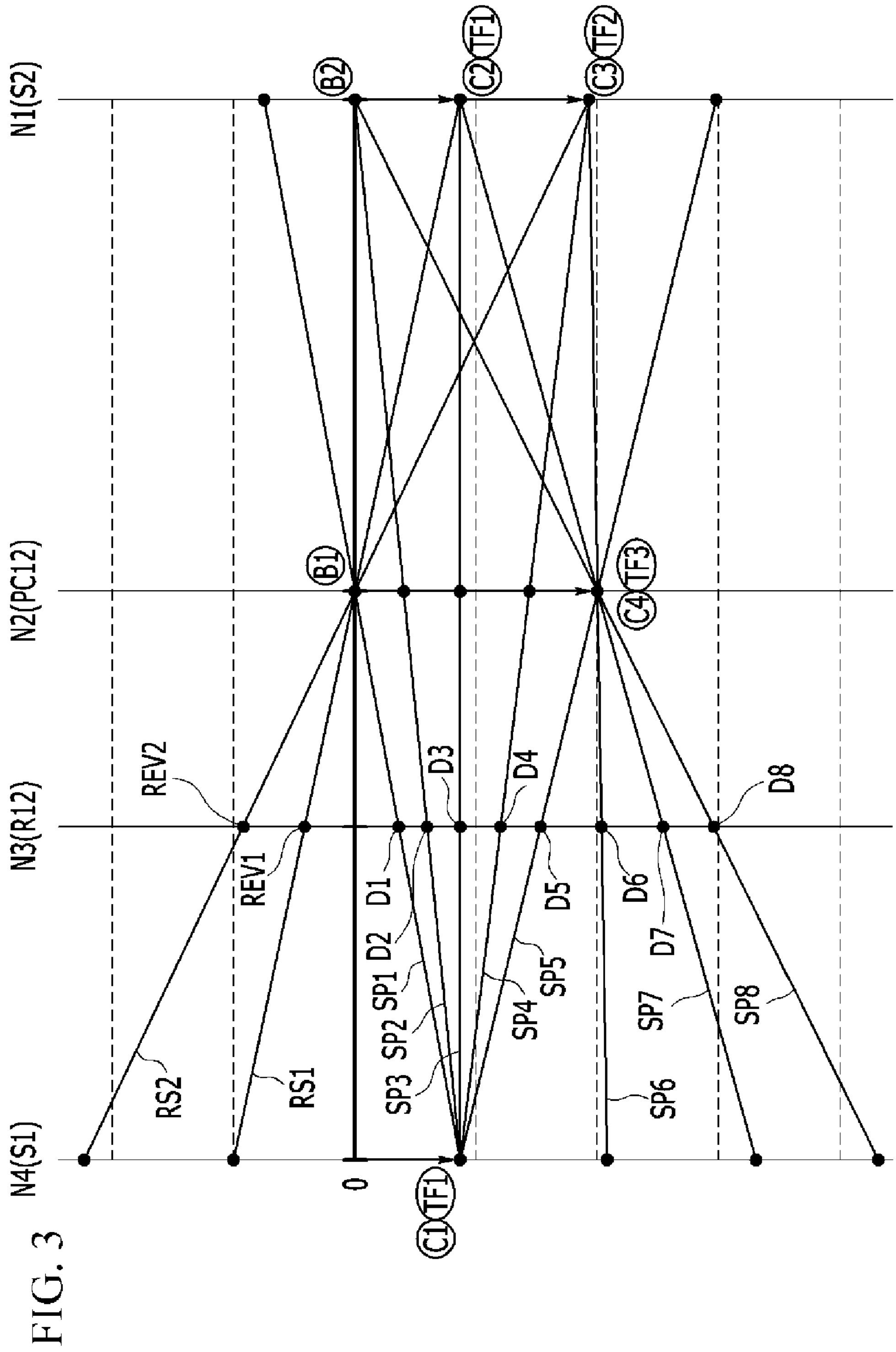
FIG. 3 is a lever diagram of a planetary gear train according to the various exemplary embodiments of the present invention.

FIG. 3 is a lever diagram of a planetary gear train according to the first exemplary embodiment of the present invention, and illustrates shift processes of the planetary gear train according to the first exemplary embodiment of the present invention by lever analysis method.

Referring to FIG. 3, four vertical lines are set as the first, second, third, and fourth rotation elements N1, N2, N3, and N4 from the right to the left, a middle horizontal line represents a rotation speed of "0", upper horizontal lines represent positive rotation speeds and lower horizontal lines represent negative rotation speeds.

In addition, "–" in FIG. 3 means that rotational elements are rotated in an opposite direction to the rotation direction of the engine. It is because the input shaft IS is externally meshed to the rotation elements of the compound planetary gear set CPG through the first, second, and third transfer gears TF1, TF2, and TF3 without an idling gear.

In addition, distances between the vertical lines of the compound planetary gear set CPG are set according to gear ratios (teeth number of a sun gear/teeth number of a ring gear).

Hereinafter, referring to FIG. 2 and FIG. 3, the shift processes of the planetary gear train according to the first exemplary embodiment of the present invention will be described in detail.

First Forward Speed

Referring to FIG. 2, the first clutch C1 and the first brake B1 are operated at the first forward speed D1.

As shown in FIG. 3, the torque of the input shaft IS is changed according to the gear ratio of the first transfer gear TF1 and is then input to the fourth rotation element N4 as an inverse rotation speed by operation of the first clutch C1. In addition, the second rotation element N2 is operated as the fixed element by operation of the first brake B1.

Therefore, the rotation elements of the compound planetary gear set CPG form a first shift line SP1, and D1 is output through the third rotation element N3 that is the output element.

Second Forward Speed

The first brake B1 that was operated at the first forward speed D1 is released and the second brake B2 is operated at the second forward speed D2.

As shown in FIG. 3, the torque of the input shaft IS is changed according to the gear ratio of the first transfer gear TF1 and is then input to the fourth rotation element N4 as the inverse rotation speed by operation of the first clutch C1. The first rotation element N1 is operated as the fixed element by operation of the second brake B2.

Therefore, the rotation elements of the compound planetary gear set CPG form a second shift line SP2, and D2 is output through the third rotation element N3 that is the output element.

Third Forward Speed

The second brake B2 that was operated at the second forward speed D2 is released and the second clutch C2 is operated at the third forward speed D3.

As shown in FIG. 3, the torque of the input shaft IS is changed according to the gear ratio of the first transfer gear TF1 and is then input to the fourth rotation element N4 as an inverse rotation speed by operation of the first clutch C1, and is changed according to the gear ratio of the first transfer gear TF1 and is then input to the first rotation element N1 as an inverse rotation speed by operation of the second clutch C2.

Therefore, the same rotation speed is input to the first rotation element N1 and the fourth rotation element N4, the rotation elements of the compound planetary gear set CPG form a third shift line SP3, and D3 is output through the third rotation element N3 that is the output element.

Fourth Forward Speed

The second clutch C2 that was operated at the third forward speed D3 is released and the third clutch C3 is operated at the fourth forward speed D4.

As shown in FIG. 3, the torque of the input shaft IS is changed according to the gear ratio of the first transfer gear TF1 and is then input to the fourth rotation element N4 as an inverse rotation speed by operation of the first clutch C1, and is changed according to the gear ratio of the second transfer gear TF2 and is then input to the first rotation element N1 as an inverse rotation speed by operation of the third clutch C3.

Therefore, the rotation elements of the compound planetary gear set CPG form a fourth shift line SP4, and D4 is output through the third rotation element N3 that is the output element.

Fifth Forward Speed

The third clutch C3 that was operated at the fourth forward speed D4 is released and the fourth clutch C4 is operated at the fifth forward speed D5.

As shown in FIG. 3, the torque of the input shaft IS is changed according to the gear ratio of the first transfer gear TF1 and is then input to the fourth rotation element N4 as an inverse rotation speed by operation of the first clutch C1, and is changed according to the gear ratio of the third transfer gear TF3 and is then input to the second rotation element N2 as an inverse rotation speed by operation of the fourth clutch C4.

Therefore, the rotation elements of the compound planetary gear set CPG form a fifth shift line SP5, and D5 is output through the third rotation element N3 that is the output element.

Sixth Forward Speed

The first clutch C1 that was operated at the fifth forward speed D5 is released and the third clutch C3 is operated at the sixth forward speed D6.

As shown in FIG. 3, the torque of the input shaft IS is changed according to the gear ratio of the second transfer gear TF2 and is then input to the first rotation element N1 as the inverse rotation speed by operation of the third clutch C3, and is changed according to the gear ratio of the third transfer gear TF3 and is then input to the second rotation element N2 as the inverse rotation speed by operation of the fourth clutch C4.

Therefore, the rotation elements of the compound planetary gear set CPG form a sixth shift line SP6, and D6 is output through the third rotation element N3 that is the output element.

Seventh Forward Speed

The third clutch C3 that was operated at the sixth forward speed D6 is released and the second clutch C2 is operated at the seventh forward speed D7.

As shown in FIG. 3, the torque of the input shaft IS is changed according to the gear ratio of the third transfer gear TF3 and is then input to the second rotation element N2 as the inverse rotation speed by operation of the fourth clutch C4, and is changed according to the gear ratio of the first transfer gear TF1 and is then input to the first rotation element N1 as the inverse rotation speed by operation of the second clutch C2.

Therefore, the rotation elements of the compound planetary gear set CPG form a seventh shift line SP7, and D7 is output through the third rotation element N3 that is the output element.

Eighth Forward Speed

The second clutch C2 that was operated at the seventh forward speed D7 is released and the second brake B2 is operated at the eighth forward speed D8.

As shown in FIG. 3, the torque of the input shaft IS is changed according to the gear ratio of the third transfer gear TF3 and is then input to the second rotation element N2 as the inverse rotation speed by operation of the fourth clutch C4. In addition, the first rotation element N1 is operated as the fixed element by operation of the second brake B2.

Therefore, the rotation elements of the compound planetary gear set CPG form an eighth shift line SP8, and D8 is output through the third rotation element N3 that is the output element.

First Reverse Speed

As shown in FIG. 2, the second clutch C2 and the first brake B1 are operated at the first reverse speed REV1.

As shown in FIG. 3, the torque of the input shaft IS is changed according to the gear ratio of the first transfer gear TF1 and is then input to the first rotation element N1 as the inverse rotation speed by operation of the second clutch C2. In addition, the second rotation element N2 is operated as the fixed element by operation of the first brake B1.

Therefore, the rotation elements of the compound planetary gear set CPG form a first reverse shift line RS1, and REV1 is output through the third rotation element N3 that is the output element.

Second Reverse Speed

As shown in FIG. 2, the third clutch C3 and the first brake B1 are operated at the second reverse speed REV2.

As shown in FIG. 3, the torque of the input shaft IS is changed according to the gear ratio of the second transfer gear TF2 and is then input to the first rotation element N1 as the inverse rotation speed by operation of the third clutch C3. In addition, the second rotation element N2 is operated as the fixed element by operation of the first brake B1.

Therefore, the rotation elements of the compound planetary gear set CPG form a second reverse shift line RS2, and REV2 is output through the third rotation element N3 that is the output element.

As described above, the planetary gear train according to the first exemplary embodiment of the present invention can achieve eight forward speeds and two reverse speeds by combining one compound planetary gear set CPG, three transfer gears TF1, TF2, and TF3 and six friction elements C1, C2, C3, C4, B1, and B2.

In addition, optimum gear ratios may be set due to ease of changing gear ratios by using three external-meshing gears as well as the planetary gear sets. Since gear ratios can be changed according to target performance, starting performance, power delivery performance, and fuel economy may be improved.

In addition, since two reverse speeds are achieved, performance in reverse speeds may be improved.

In addition, two friction elements are operated at each shift-speed and one friction element is released and another friction element is operated so as to shift to a neighboring shift-speed. Therefore, shift control condition is fully satisfied.

Figure 4:
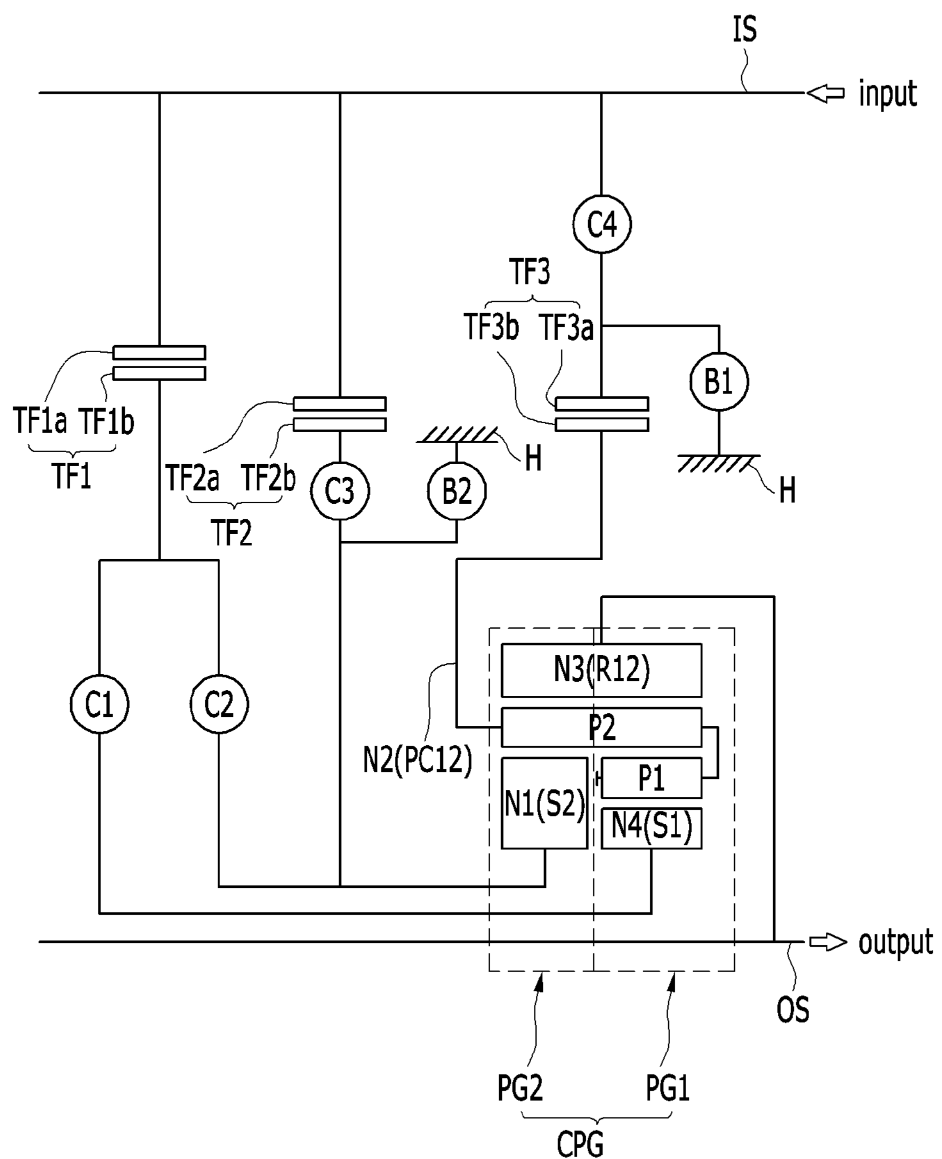
FIG. 4 is a schematic diagram of a planetary gear train according to the various exemplary embodiments of the present invention.

FIG. 4 is a schematic diagram of a planetary gear train according to the second exemplary embodiment of the present invention.

Referring to FIG. 4, although the third clutch C3 is disposed between the input shaft IS and the second transfer gear TF2 and the second brake B2 is disposed between the second transfer gear TF2 and the transmission housing H in the first exemplary embodiment, the third clutch C3 is disposed between the second transfer gear TF2 and the first rotation element N1 and the second brake B2 is disposed between the first rotation element N1 and the transmission housing H in the second exemplary embodiment.

That is, the second brake B2 operates the first rotation element N1 as the fixed element while the third clutch C3 is not operated.

Since functions of the second exemplary embodiment are the same as those of the first exemplary embodiment except the positions of the third clutch C3 and the second brake B2, detailed description thereof will be omitted.

Figure 5:
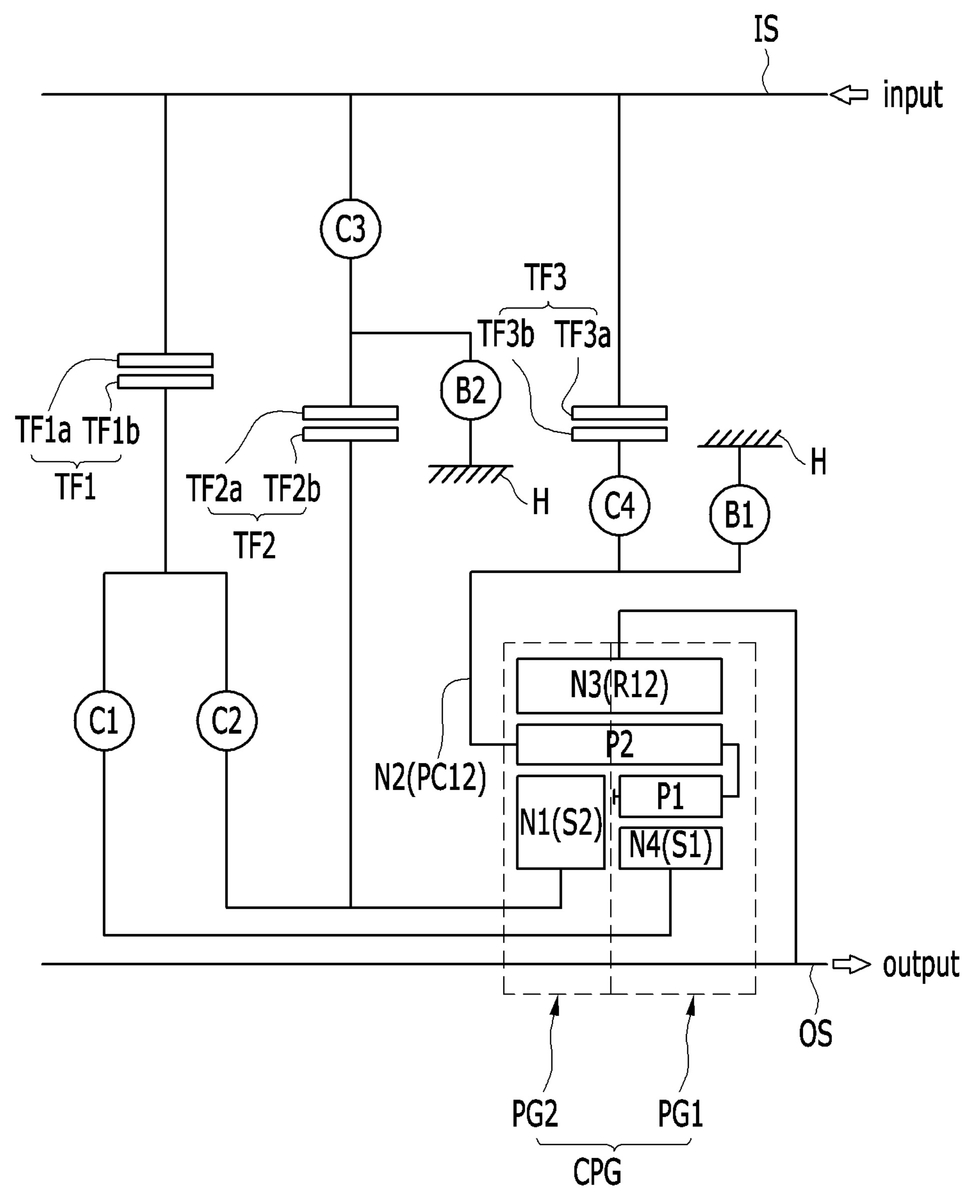
FIG. 5 is a schematic diagram of a planetary gear train according to the various exemplary embodiments of the present invention.

FIG. 5 is a schematic diagram of a planetary gear train according to the third exemplary embodiment of the present invention.

Referring to FIG. 5, although the fourth clutch C4 is disposed between the input shaft IS and the third transfer gear TF3 and the first brake B1 is disposed between the third transfer gear TF3 and the transmission housing H in the first exemplary embodiment, the fourth clutch C4 is disposed between the third transfer gear TF3 and the second rotation element N2 and the first brake B1 is disposed between the second rotation element N2 and the transmission housing H in the third exemplary embodiment.

That is, the first brake B1 operates the second rotation element N2 as the fixed element while the fourth clutch C4 is not operated.

Since functions of the third exemplary embodiment are the same as those of the first exemplary embodiment except the positions of the fourth clutch C4 and the first brake B1, detailed description thereof will be omitted.

Figure 6:
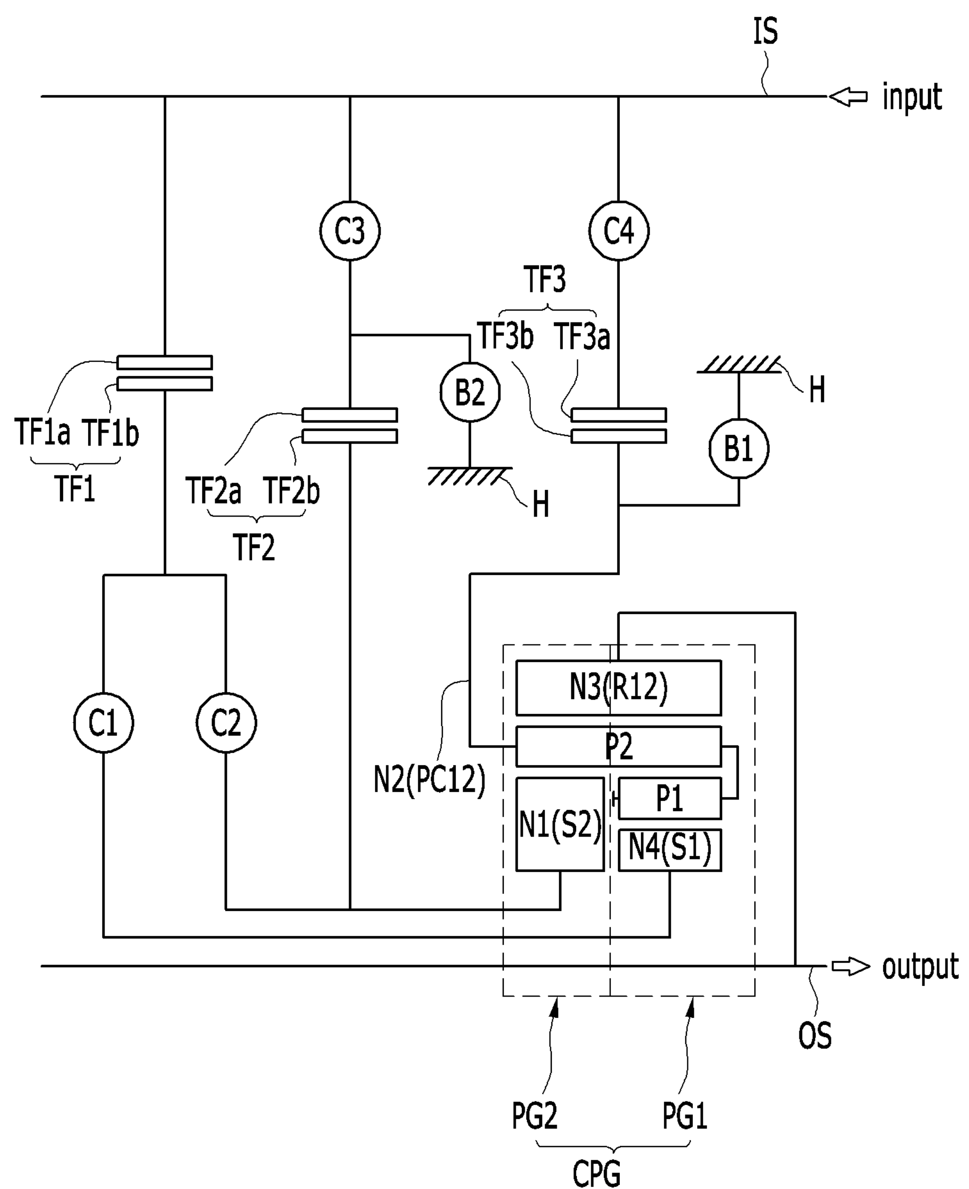
FIG. 6 is a schematic diagram of a planetary gear train according to the various exemplary embodiments of the present invention.

FIG. 6 is a schematic diagram of a planetary gear train according to the fourth exemplary embodiment of the present invention.

Referring to FIG. 6, although the first brake B1 is disposed between the third transfer drive gear TF3*a* and the transmission housing H in the first exemplary embodiment, the first brake B1 is disposed between the third transfer driven gear TF3*b* and the transmission housing H in the fourth exemplary embodiment.

Since functions of the fourth exemplary embodiment are the same as those of the first exemplary embodiment except the position of the first brake B1, detailed description thereof will be omitted.

Figure 7:
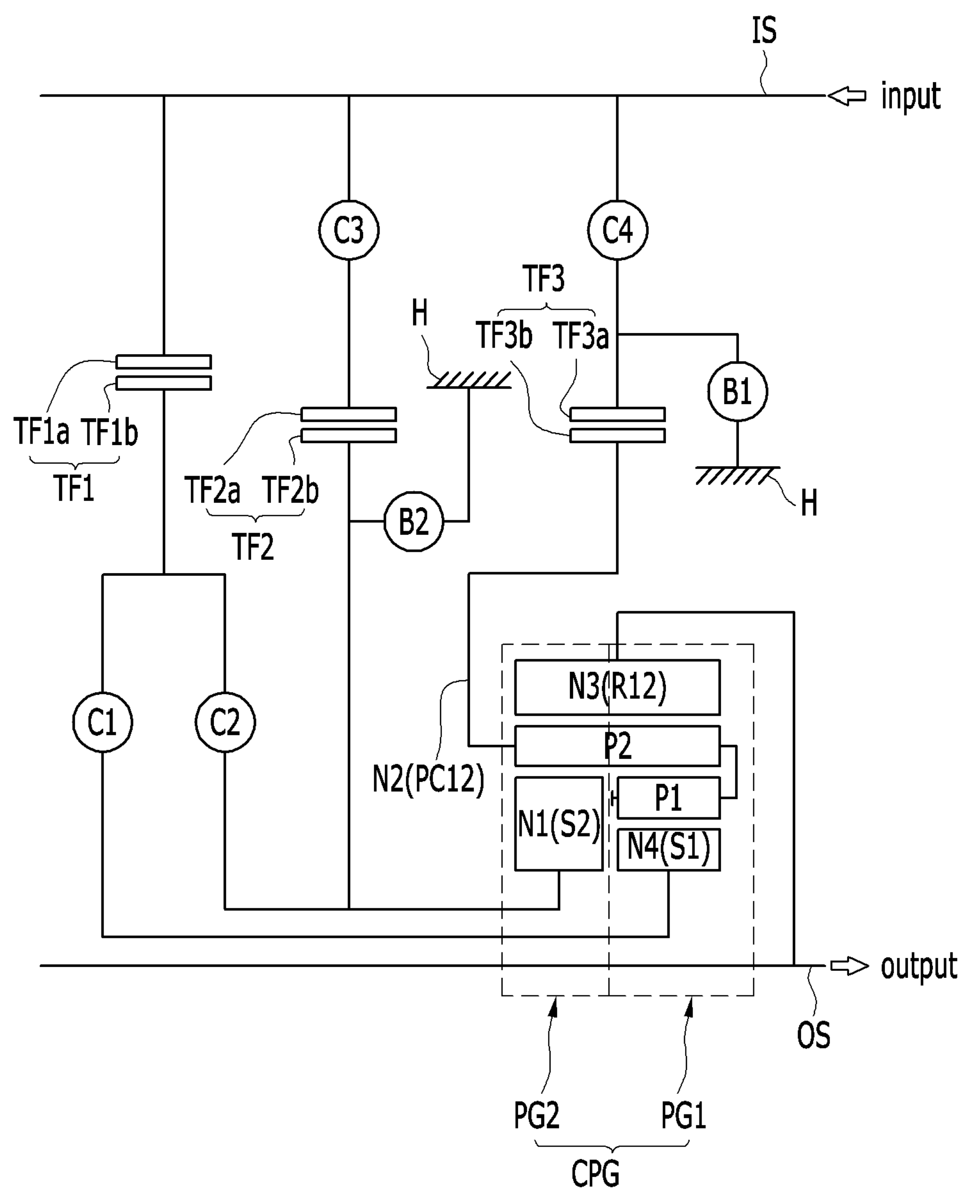
FIG. 7 is a schematic diagram of a planetary gear train according to the various exemplary embodiments of the present invention.

FIG. 7 is a schematic diagram of a planetary gear train according to the fifth exemplary embodiment of the present invention.

Referring to FIG. 7, the second brake B2 is disposed between the second transfer drive gear TF2*a* and the transmission housing H in the first exemplary embodiment, but the second brake B2 is disposed between the second transfer driven gear TF2*b* and the transmission housing H in the fifth exemplary embodiment.

Since functions of the fifth exemplary embodiment are the same as those of the first exemplary embodiment except the position of the second brake B2, detailed description thereof will be omitted.

Eight forward speeds and two reverse speeds can be achieved by combining one compound planetary gear set, three transfer gears and six friction elements according to exemplary embodiments of the present invention.

In addition, since the compound planetary gear set is disposed on the output shaft disposed in parallel with the input shaft and is connected to the input shaft through the transfer gears that are the externally-meshed gears, a length thereof may be reduced and mountability may be improved.

In addition, optimum gear ratios may be set due to ease of changing gear ratios by using three external-meshing gears as well as the planetary gear sets. Since gear ratios can be changed according to target performance, starting performance, power delivery performance, and fuel economy may be improved.

In addition, since two reverse speeds are achieved, performance in reverse speeds may be improved.

In addition, two friction elements are operated at each shift-speed, and one friction element is released and another friction element is operated so as to shift to a neighboring shift-speed. Therefore, shift control condition is fully satisfied.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A planetary gear train of an automatic transmission for a vehicle, comprising:
- an input shaft receiving torque of an engine;
- an output shaft disposed apart from and in parallel with the input shaft;
- a compound planetary gear set disposed on the output shaft, and including:
  - a first rotation element selectively connected to the input shaft through two paths respectively having an externally-meshed gear and operated as a selective fixed element;
  - a second rotation element selectively connected to the input shaft through one path having an externally-meshed gear and operated as a selective fixed element;
  - a third rotation element connected to the output shaft so as to be operated as an output element; and
  - a fourth rotation element selectively connected to the input shaft through one path having an externally-meshed gear;
- three transfer gears forming the externally-meshed gears; and
- friction elements including:
  - clutches selectively connecting the first, second, and fourth rotation elements to the input shaft; and
  - brakes selectively connecting the first and second rotation elements to a transmission housing.

2. The planetary gear train of claim 1,
wherein the compound planetary gear set including:
- a first planetary gear set being a double pinion planetary gear set; and
- a second planetary gear set being a single pinion planetary gear set and having a ring gear and a planet carrier in common with the first planetary gear set, and wherein the first rotation element is a second sun gear, the second rotation element is the planet carrier, the third rotation element is the ring gear, and the fourth rotation element is a first sun gear.

3. The planetary gear train of claim 1, wherein the three transfer gears comprise:
- a first transfer gear including:
  - a first transfer drive gear connected to the input shaft; and
  - a first transfer driven gear selectively connected to the first rotation element and the fourth rotation element;
- a second transfer gear including:
  - a second transfer drive gear connected to the input shaft; and
  - a second transfer driven gear connected to the first rotation element; and
- a third transfer gear including:
  - a third transfer drive gear connected to the input shaft; and
  - a third transfer driven gear connected to the second rotation element.

4. The planetary gear train of claim 3,
wherein the clutches include:
- a first clutch disposed between the first transfer gear and the fourth rotation element;
- a second clutch disposed between the first transfer gear and the first rotation element;
- a third clutch disposed between the input shaft and the second transfer gear;
- a fourth clutch disposed between the input shaft and the third transfer gear; and wherein the brakes include:
- a first brake disposed between the third transfer gear and the transmission housing; and
- a second brake disposed between the second transfer gear and the transmission housing.

5. The planetary gear train of claim 4, wherein the first brake is disposed between the third transfer drive gear and the transmission housing.

6. The planetary gear train of claim 4, wherein the first brake is disposed between the third transfer driven gear and the transmission housing.

7. The planetary gear train of claim 4, wherein the second brake is disposed between the second transfer drive gear and the transmission housing.

8. The planetary gear train of claim 4, wherein the second brake is disposed between the second transfer driven gear and the transmission housing.

9. The planetary gear train of claim 3, wherein the clutches include:

a first clutch disposed between the first transfer gear and the fourth rotation element;

a second clutch disposed between the first transfer gear and the first rotation element;

a third clutch disposed between the second transfer gear and the first rotation element;

a fourth clutch disposed between the input shaft and the third transfer gear; and wherein the brakes include:

a first brake disposed between the third transfer gear and the transmission housing; and a second brake disposed between the second transfer gear and the transmission housing.

10. The planetary gear train of claim 3, wherein the clutches include:

a first clutch disposed between the first transfer gear and the fourth rotation element;

a second clutch disposed between the first transfer gear and the first rotation element;

a third clutch disposed between the input shaft and the second transfer gear;

a fourth clutch disposed between the third transfer gear and the second rotation element; and wherein the brakes include:

a first brake disposed between the third transfer gear and the transmission housing; and a second brake disposed between the second transfer gear and the transmission housing.

11. The planetary gear train of claim 4, wherein:

the first clutch and the first brake are operated at a first forward speed, the first clutch and the second brake are operated at a second forward speed, the first clutch and the second clutch are operated at a third forward speed, the first clutch and the third clutch are operated at a fourth forward speed, the first clutch and the fourth clutch are operated at a fifth forward speed, the third clutch and the fourth clutch are operated at a sixth forward speed, the second clutch and the fourth clutch are operated at a seventh forward speed, the fourth clutch and the second brake are operated at an eighth forward speed, the second clutch and the first brake are operated at a first reverse speed, and the third clutch and the first brake are operated at a second reverse speed.

12. A planetary gear train of an automatic transmission for a vehicle, comprising:

an input shaft receiving torque of an engine;

an output shaft disposed apart from and in parallel with the input shaft;

a compound planetary gear set including:

a first planetary gear set being a double pinion planetary gear set; and a second planetary gear set being a single pinion planetary gear set and having a ring gear and a planet carrier in common with the first planetary gear set, and including a first rotation element being a second sun gear, a second rotation element being the planet carrier, a third rotation element being the ring gear, and a fourth rotation element being a first sun gear;

a first transfer gear including:

a first transfer drive gear connected to the input shaft; and a first transfer driven gear selectively connected to the first rotation element and the fourth rotation element;

a second transfer gear including:

a second transfer drive gear connected to the input shaft; and a second transfer driven gear connected to the first rotation element;

a third transfer gear including:

a third transfer drive gear connected to the input shaft; and a third transfer driven gear connected to the second rotation element; and friction elements including:

clutches selectively connecting the first, second, and fourth rotation elements to the input shaft; and brakes selectively connecting the first and second rotation elements to a transmission housing.

13. The planetary gear train of claim 12, wherein the clutches include:

a first clutch disposed between the first transfer gear and the fourth rotation element;

a second clutch disposed between the first transfer gear and the first rotation element;

a third clutch disposed between the input shaft and the second transfer gear;

a fourth clutch disposed between the input shaft and the third transfer gear; and wherein the brakes include:

a first brake disposed between the third transfer gear and the transmission housing; and a second brake disposed between the second transfer gear and the transmission housing.

14. The planetary gear train of claim 13, wherein the first brake is disposed between the third transfer drive gear and the transmission housing.

15. The planetary gear train of claim 13, wherein the first brake is disposed between the third transfer driven gear and the transmission housing.

16. The planetary gear train of claim 13, wherein the second brake is disposed between the second transfer drive gear and the transmission housing.

17. The planetary gear train of claim 13, wherein the second brake is disposed between the second transfer driven gear and the transmission housing.

18. The planetary gear train of claim 12, wherein the clutches include:

a first clutch disposed between the first transfer gear and the fourth rotation element;

a second clutch disposed between the first transfer gear and the first rotation element;

a third clutch disposed between the second transfer gear and the first rotation element;

a fourth clutch disposed between the input shaft and the third transfer gear; and wherein the brakes include:

a first brake disposed between the third transfer gear and the transmission housing; and a second brake disposed between the second transfer gear and the transmission housing.

19. The planetary gear train of claim 12, wherein the clutches include:

a first clutch disposed between the first transfer gear and the fourth rotation element;

a second clutch disposed between the first transfer gear and the first rotation element;

a third clutch disposed between the input shaft and the second transfer gear;

a fourth clutch disposed between the third transfer gear and the second rotation element; and wherein the brakes include:

a first brake disposed between the third transfer gear and the transmission housing; and a second brake disposed between the second transfer gear and the transmission housing.

* * * * *